US006981703B2

(12) United States Patent
Kinoshita

(10) Patent No.: US 6,981,703 B2
(45) Date of Patent: *Jan. 3, 2006

(54) CYLINDER HEAD GASKET

(75) Inventor: Yuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 10/736,700

(22) Filed: Dec. 17, 2003

(65) Prior Publication Data

US 2005/0134007 A1 Jun. 23, 2005

(51) Int. Cl.
*F02F 11/00* (2006.01)

(52) U.S. Cl. ....................................... 277/592; 277/594

(58) Field of Classification Search ................ 277/592, 277/595, 593, 596

See application file for complete search history.

(56) References Cited

U.S. PATENT DOCUMENTS

| | | | | |
|---|---|---|---|---|
| 4,659,410 A | * | 4/1987 | McDowell et al. | 156/277 |
| 5,150,910 A | * | 9/1992 | Udagawa | 277/592 |
| 5,310,197 A | * | 5/1994 | Bruch et al. | 277/601 |
| 5,582,415 A | | 12/1996 | Yoshida et al. | |
| 5,769,430 A | * | 6/1998 | Udagawa | 277/592 |
| 6,073,938 A | * | 6/2000 | Abe et al. | 277/654 |
| 6,209,883 B1 | * | 4/2001 | Kashmerick et al. | 277/593 |
| 6,318,733 B1 | * | 11/2001 | Udagawa | 277/596 |
| 6,550,782 B2 | * | 4/2003 | Okazaki et al. | 277/592 |
| 6,575,473 B2 | * | 6/2003 | Sugimoto et al. | 277/592 |
| 6,682,080 B2 | * | 1/2004 | Miyaoh | 277/592 |

FOREIGN PATENT DOCUMENTS

EP 1 275 889 1/2003

* cited by examiner

*Primary Examiner*—Alison K. Pickard
(74) *Attorney, Agent, or Firm*—Manabu Kanesaka

(57) ABSTRACT

A cylinder head gasket is formed of one metal plate having a cylinder bore and a folded portion around the cylinder bore. A paint coating formed of a hard paint layer is provided on at least one side of the metal plate at an outer periphery side of the folded portion for forming a surface pressure thereat. Accordingly, the cylinder head gasket is provided with excellent sealing performance and durability.

1 Claim, 8 Drawing Sheets

CYLINDER HEAD GASKET

BACKGROUND OF THE INVENTION AND RELATED ART STATEMENT

The present invention relates to a cylinder head gasket to be disposed between two members such as a cylinder head and a cylinder block for sealing therebetween. More specifically, the present invention relates to a cylinder head gasket including one metal plate with a coating layer of paint where a surface pressure is generated.

When a joint portion between a cylinder head and a cylinder block (cylinder body) in an automobile engine is sealed, a cylinder head gasket is placed between the two members for sealing combustion gas or cooling water, etc.

A configuration of the cylinder head gasket has been shifted from a laminated type formed of a plurality of laminated metal plates to a simple structure type in which a cylinder head gasket is formed of a single sheet of metal to meet demands for reducing a weight of an engine and a manufacturing cost. In the cylinder head gasket formed of a single sheet, a material for the plate is limited. As a result, it is difficult to provide a bead, a grommet, or a shim used as sealing means in the laminated type formed of a plurality of metal plates. It is also difficult to overlap the sealing means.

Accordingly, in the simple structure formed of a single sheet, the sealing means is limited in a few varieties and a small quantity, and it is necessary to use simplified sealing means. Further, an area for the sealing means has been decreased as a size of an engine has been reduced.

As shown in FIG. 15, a cylinder head gasket 1 is formed according to a shape of an engine member such as a cylinder block, and has cylinder bores 2, liquid holes 3 for circulating cooling water or engine oil, and bolt holes 4 for inserting bolts. Sealing means 12 and 13 such as a folded portion and a bead are provided for each bore or hole for sealing.

Even in the same gasket for sealing the same engine member, it is necessary to provide different sealing performances according to types of the bores. For the cylinder bore, it is necessary to seal high-temperature and high-pressure combustion gas. On the other hand, for the liquid hole, it is necessary to seal relatively low-temperature and low-pressure liquid.

Also, due to a structure of the engine, there is a difference in a surface pressure between the cylinder bore surrounded by the bolt holes and the liquid hole provided outside the bolt holes and having one sided force applied by the fastening bolt.

In order to provide the different sealing performances, the folded portions 12 are provided for the cylinder bores 2 to seal the high-heat and high-pressure gas inside the cylinder, and the half beads 13 are provided for the liquid holes 3.

When the folded portion is provided for sealing the cylinder bore, the surface pressure is concentrated at the folded portion. Therefore, an engine member made of relatively soft aluminum alloy may be damaged, so that the sealing performance is deteriorated at a damaged area. It is possible to provide an elastic rubber coating for improving compatibility of a gasket with an engine member abutting against the gasket. However, when the elastic rubber coating is used, it is difficult to generate and maintain a large surface pressure. Further, a portion of the elastic coating covering the folded portion tends to creep and wear after a long term due to a large surface pressure generated by the folded portion. The elastic coating also tends to be deteriorated easily by heat and pressure of the gas inside the cylinder, resulting in torque down, i.e. a decrease in the sealing surface pressure. As a result, it is difficult to maintain the sealing performance for a long time.

When a shim is provided for adjusting a distribution of the surface pressure around the folded portion, it is difficult to fine adjustment of the surface pressure due to a limitation of adjusting a thickness of the shim, and it takes a long tedious process to form the shim. In addition, when the shim is formed at an end portion of the folded portion or a depression formed with coining to adjust a level difference, it is necessary to perform the coining and provide an accurate mold, thereby increasing a cost.

In view of the problems described above, the present invention has been made, and an object of the invention is to provide a cylinder head gasket formed of a single metal plate for sealing a joint surface between two members such as a cylinder head and a cylinder block of an engine, wherein it is possible to generate and maintain appropriate distributions of surface pressures around a cylinder bore and a liquid hole, thereby obtaining good sealing performance and good durability.

Another object of the invention is to provide a cylinder head gasket in which it is possible to adjust the distributions of the surface pressures around the cylinder bore and the liquid hole to meet different sealing performances, respectively.

Further objects and advantages of the invention will be apparent from the following description of the invention.

SUMMARY OF INVENTION

In order to achieve the above-mentioned objectives, according to a first embodiment of the present invention, a cylinder head gasket includes a metal plate having a cylinder bore and a folded portion around the cylinder bore. A first paint coating area formed of a hard paint layer is provided on at least one side of the metal plate at an outer periphery side of the folded portion for generating a surface pressure.

In the first embodiment of the present invention, an outer periphery edge of the folded portion may be connected to an inner edge of the first paint coating area, or may be separated with a gap. In other words, the first paint coating area does not overlap with the folded portion. In this structure, the first paint coating area is formed of the hard paint layer for generating and maintaining the surface pressure, i.e. a surface pressure generative member. Accordingly, it is possible to generate the surface pressure even outside the folded portion, thereby forming an appropriate sealing line around the cylinder bore and improving the sealing performance.

In the first embodiment of the present invention, the first paint coating area is provided on the outer periphery side of the folded portion, and high-temperature and high-pressure gas from the cylinder bore is sealed at the folded portion. Accordingly, the first paint coating area is protected with the folded portion, thereby obtaining high durability. It is possible to easily adjust a thickness of the paint layer through the number of applications of paint, and to easily select a location of the applications.

In the first embodiment of the present invention, the first paint coating area is provided only around the folded portion. Accordingly, it is possible to provide a surface pressure generating member having an arbitrary shape and a thickness distribution with high precision around the cylinder bore. When the surface pressure generating member is properly provided, it is possible to optimize the distribution of the surface pressure around the cylinder bore.

According to a second embodiment of the present invention, a cylinder head gasket is formed of a single metal plate having a cylinder bore and a liquid hole. A folded portion is provided around the cylinder bore, and a bead is provided around the liquid hole. A second paint coating area formed of a hard paint layer is provided on at least one side of the bead for generating a surface pressure only around the liquid hole.

In the second embodiment of the present invention, the second paint coating area is provided for generating and maintaining the surface pressure around the liquid hole. Accordingly, it is possible to adjust a thickness of the folded portion and a thickness around the liquid hole for adjusting the surface pressure generated around the liquid hole, thereby forming the appropriate sealing line and improving the sealing performance around the liquid hole.

In the second embodiment of the present invention, it is possible to easily adjust a thickness of the paint layer through the number of applications of the paint, and to easily select a location of the applications. Accordingly, it is possible to provide a surface pressure generating member having an arbitrary shape and a thickness distribution with high precision around the liquid hole. When the surface pressure generating member is properly provided, it is possible to optimize the distribution of the surface pressure around the liquid hole.

According to a third embodiment of the present invention, a cylinder head gasket is formed of a metal plate having a cylinder bore and a liquid hole. A folded portion is provided around the cylinder bore, and a bead is provided around the liquid hole. A first paint coating area formed of a hard paint layer is provided on at least one side of the metal plate at an outer periphery side of the folded portion for generating a surface pressure. A second paint coating area formed of a hard paint layer is provided on at least one side of the bead outside the first paint coating area for generating a surface pressure. The second paint coating area has a thickness less than that of the first paint coating area.

In the third embodiment of the present invention, an outer periphery edge of the folded portion may be connected to an inner edge of the first paint coating area, or may be separated with a gap. Also, an outer edge of the first paint coating area may be connected to an inner edge of the second paint coating area or may be separated with a gap. The second paint coating area may be disposed only around the liquid hole outside the bead. Also, the first paint coating area and the second paint coating area may be provided on one side or both sides of the metal plate. One of the first paint coating area and the second paint coating area may be provided on one side and the other may be provided on both sides. When provided on both sides, a total thickness of the both sides is determined by a magnitude of the surface pressure. When provided on one side, a thickness of the one side is determined by a magnitude of the surface pressure.

In the third embodiment of the present invention, the first paint coating area is provided around the folded portion. Further, the second paint coating area with a thickness less than the first paint coating area is provided around the liquid hole. Accordingly, a relatively large surface pressure is generated at the folded portion, and a medium surface pressure is generated at the first paint coating area around the cylinder bore. A relatively small surface pressure is generated at the second paint coating area around the liquid hole. As a result, it is possible to provide a fine adjustment of the sealing performances for the cylinder bore and the liquid hole at the same time. In other words, it is possible to easily obtain an appropriate sealing balance for each bore or hole of the gasket.

In the third embodiment of the present invention, it is possible to easily adjust a thickness of the paint layer through the number of applications of the paint, and to easily select a location of the applications. Accordingly, it is possible to provide a surface pressure generating member having an arbitrary shape and a thickness distribution with high precision around the cylinder bore and the liquid hole. When the surface pressure generating member is properly provided, it is possible to optimize the distribution of the surface pressure around the cylinder bore and the liquid hole. The second paint coating area is provided on at least one side of the bead only around the liquid hole, thereby optimizing the distribution of the surface pressure around the liquid hole.

In the third embodiment of the present invention, the first paint coating area may have a largest thickness including at the folded portion. Accordingly, it is possible to obtain the largest surface pressure around the cylinder bore required for the high sealing performance.

In the third embodiment of the present invention, the paint layer may be formed of a synthetic paint resin. The first paint coating area and second paint coating area are required to generate and maintain at least moderate surface pressure. Therefore, it is necessary to form a hard synthetic resin coating with a hardness of 2H to 6H in pencil hardness, not an elastic rubber-based paint coating with a hardness of B to 5B in pencil hardness. Such a synthetic resin includes an epoxy resin, phenol resin, phenoxy resin, fluorine resin, polyamide resin, and polyamide-imide resin, or a combination thereof.

In the present invention, the bead for sealing the cylinder bore is not required outside the folded portion around the cylinder bore. However, when the bead is provided, an entire portion or a part of the bead may be included in the first paint coating area, or the bead may be provided outside the first paint coating area.

BRIEF DESCRIPTION OF THE DRAWINGS

FIG. 10(*b*) is a sectional view showing a cylinder head gasket of a still further embodiment; and FIG. 10(*c*) is a sectional view showing a cylinder head gasket of a still further embodiment;

DETAILED DESCRIPTION OF PREFERRED EMBODIMENTS

Figure 12:
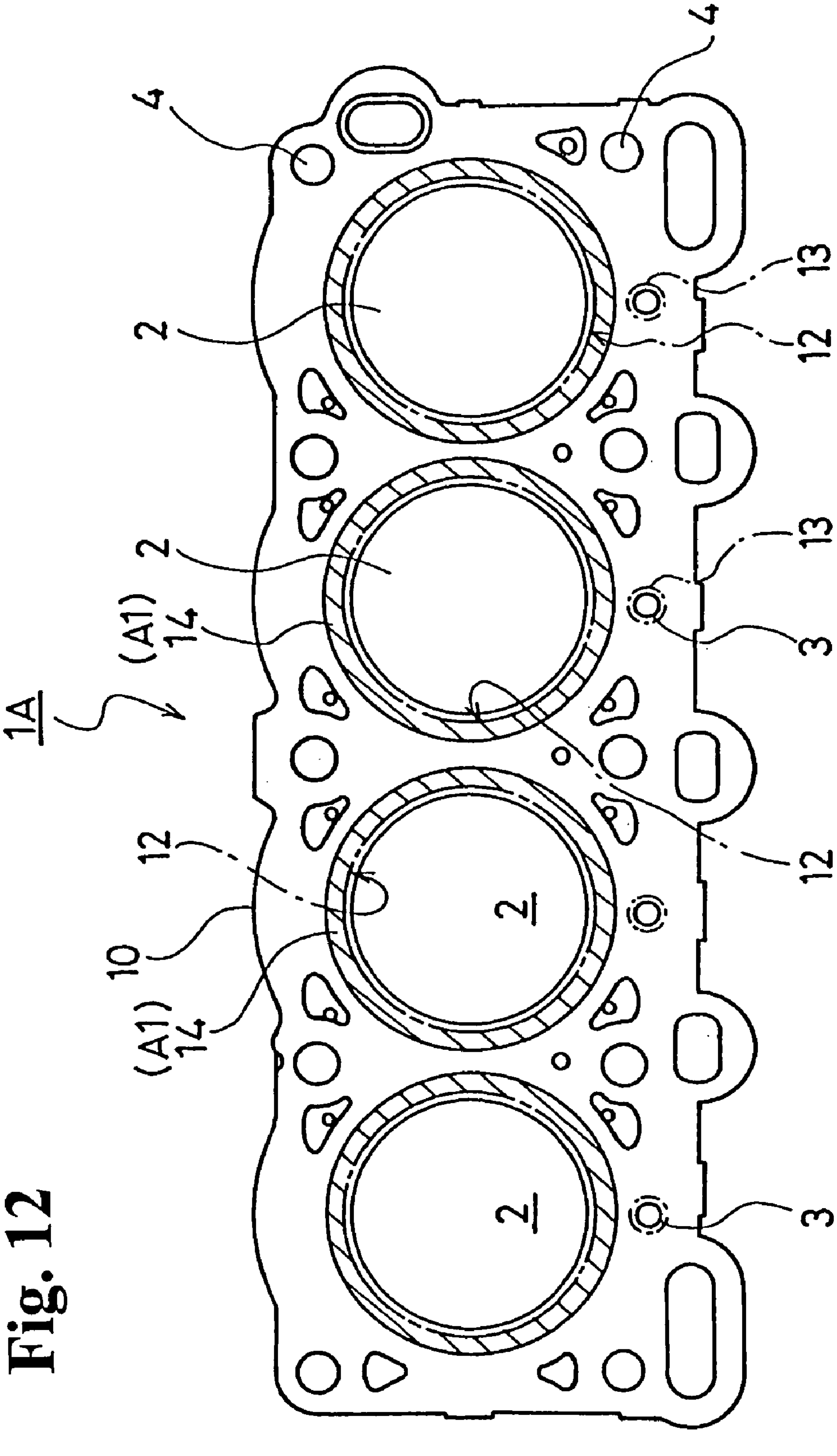
FIG. 12 is a plan view showing the cylinder head gasket of the embodiment shown in FIG. 1.
Figure 13:
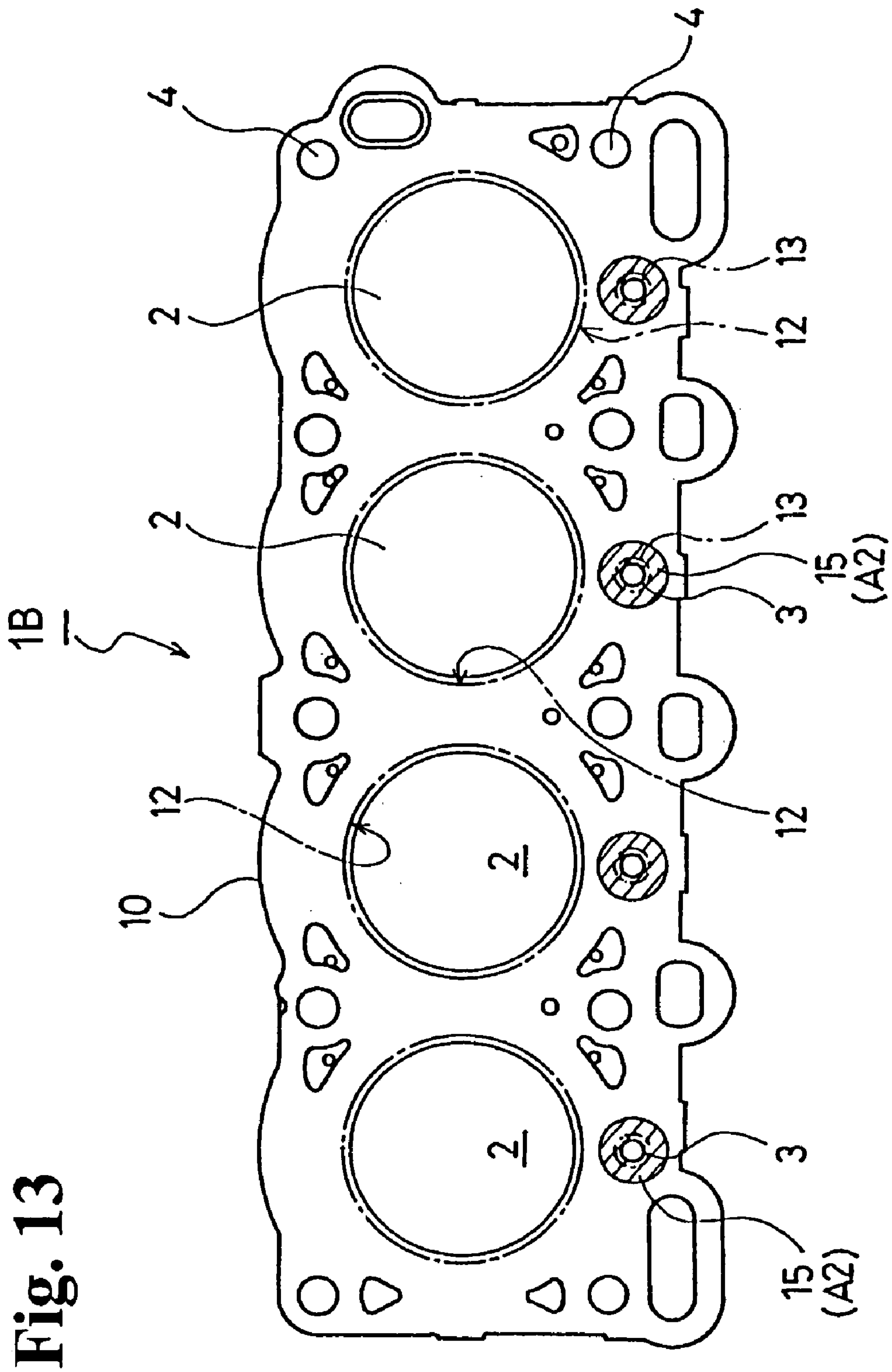
FIG. 13 is a plan view showing the cylinder head gasket of the embodiment shown in FIG. 2.
Figure 14:
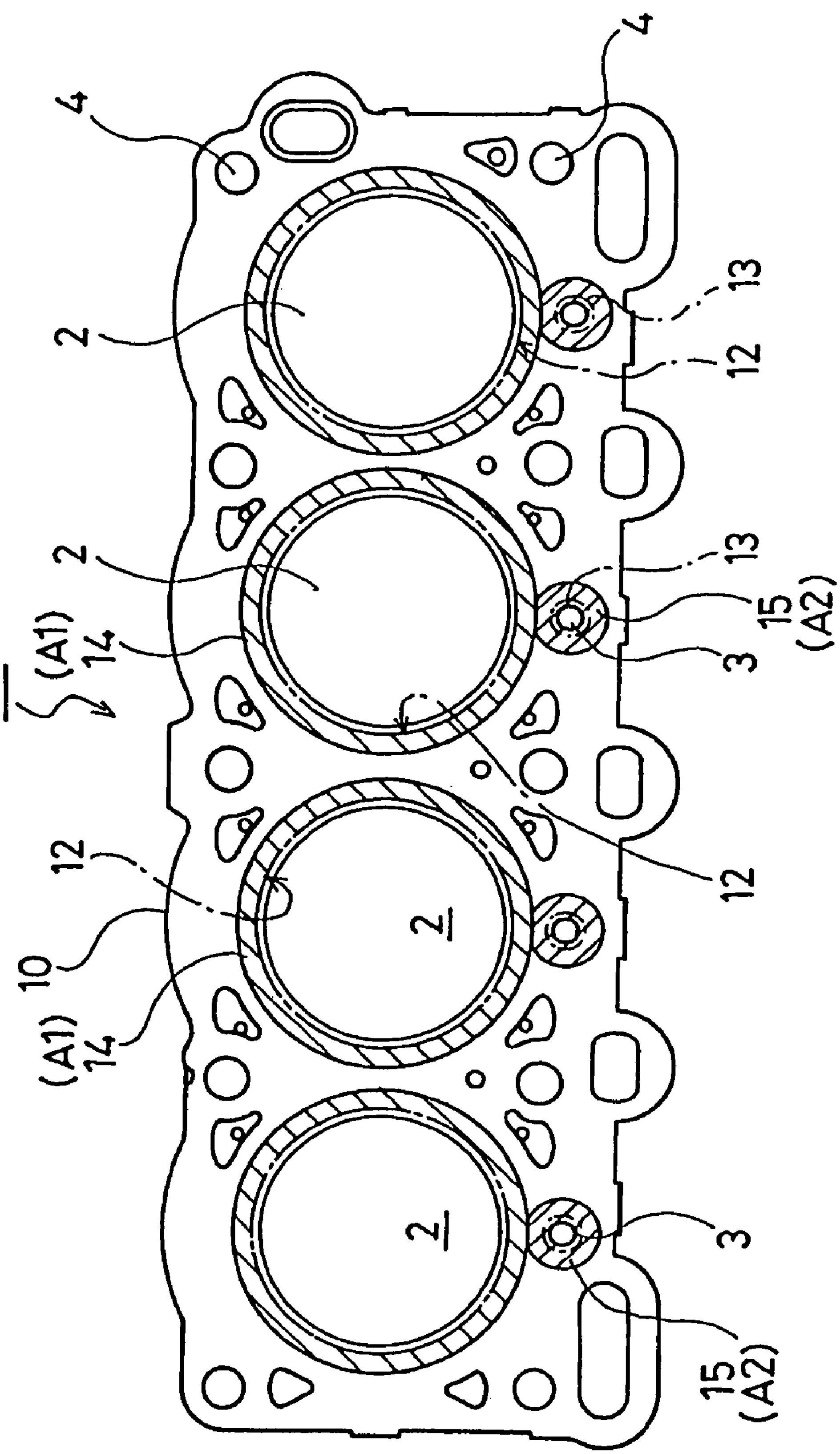
FIG. 14 is a plan view showing the cylinder head gasket of the embodiment shown in FIG. 3.
Figure 15:
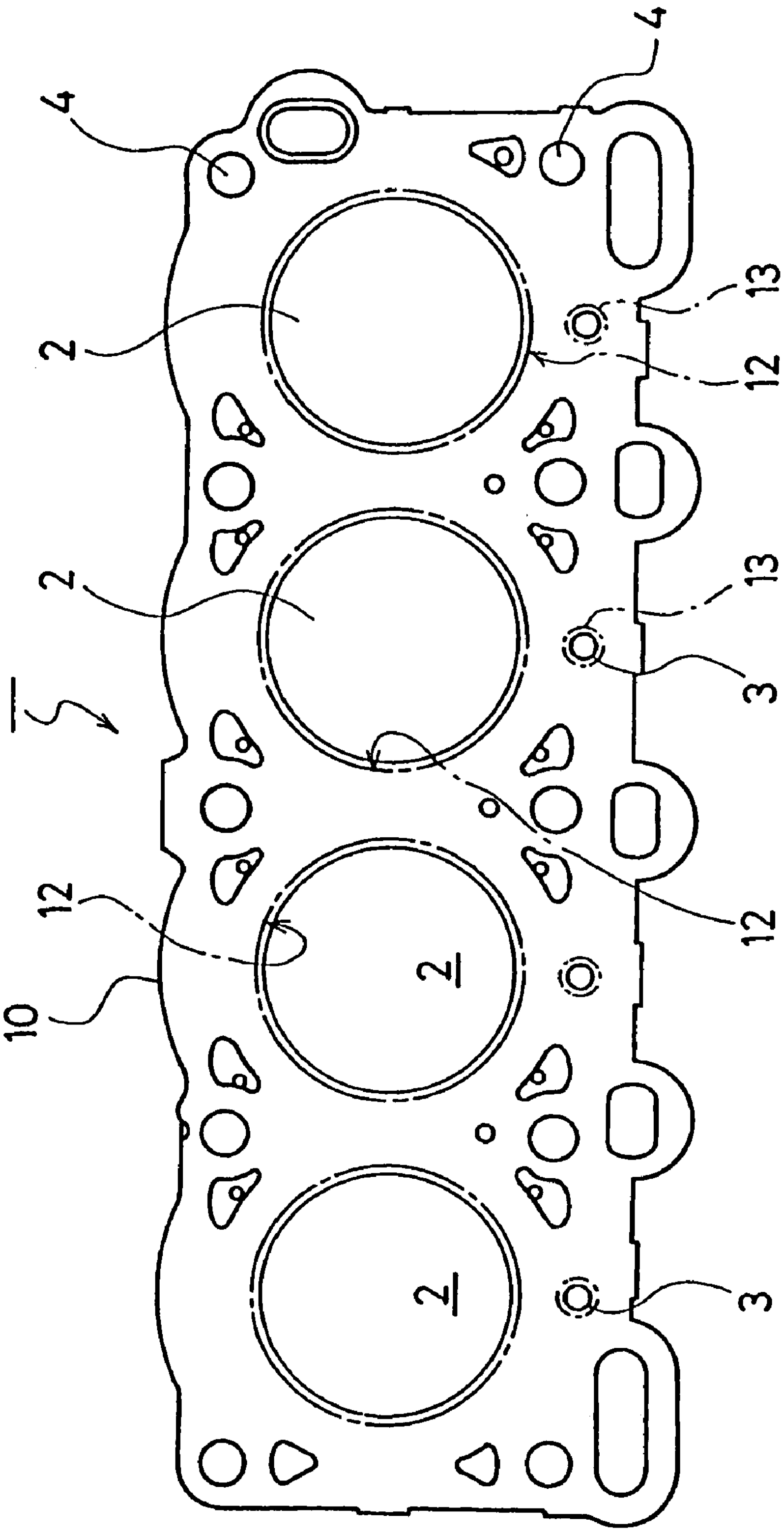
FIG. 15 is a plan view showing an example of a cylinder head gasket formed of a single plate.

Hereunder, embodiments of the present invention will be explained with reference to the accompanying drawings. As shown in FIGS. 12 to 14, cylinder head gaskets 1A, 1B, 1C are disposed between a cylinder head and a cylinder block (cylinder body) of an engine for sealing high-temperature and high-pressure combustion gas in a cylinder bore and liquid such as cooling water and oil in a cooling water hole and a cooling oil hole.

FIGS. 1 to 10(*c*) are views showing sealing portions of cylinder head gaskets in which a plate thickness, a size of a bead, and a paint coating are shown in an enlarged scale different from actual ones for explanation purpose.

As shown in FIGS. 12 to 14, the cylinder head gaskets 1A, 1B, 1C are formed of a metal plate 10 such as an annealed stainless steel (annealed steel), a thermally refined stainless steel (spring steel), and a soft steel plate. The metal plate 10 is formed in a shape corresponding to a shape of an engine member such as the cylinder block, and is provided with cylinder bores 2, liquid holes 3 for circulating cooling water or engine oil, and bolt holes 4 for inserting bolts. Folded portions 12 are formed around the cylinder bores 2 and half beads 13 are formed around the liquid holes 3 such as cooling water holes or oil holes, respectively.

Figure 1:
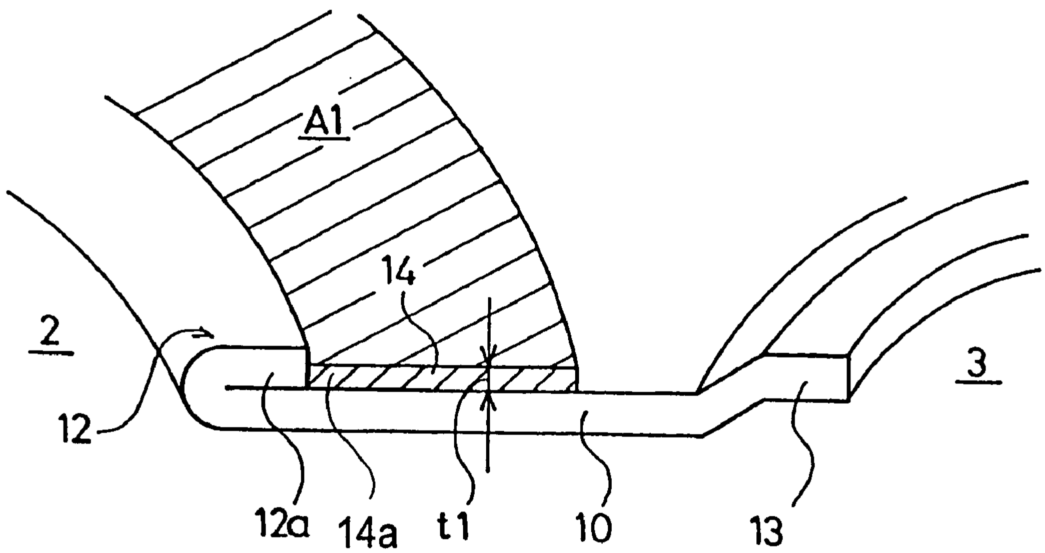
FIG. 1 is a sectional view showing a cylinder head gasket of an embodiment of the present invention.
Figure 2:
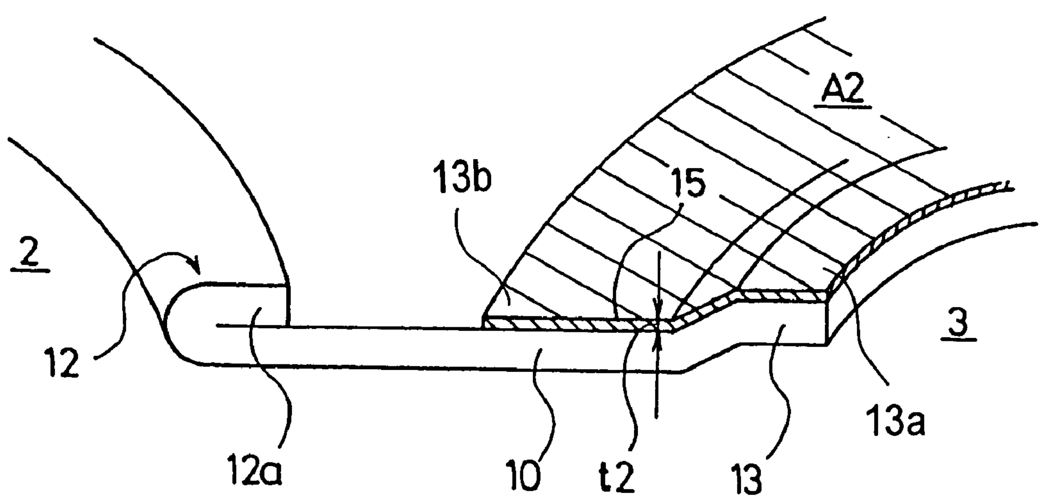
FIG. 2 is a sectional view showing a cylinder head gasket of another embodiment of the present invention.
Figure 3:
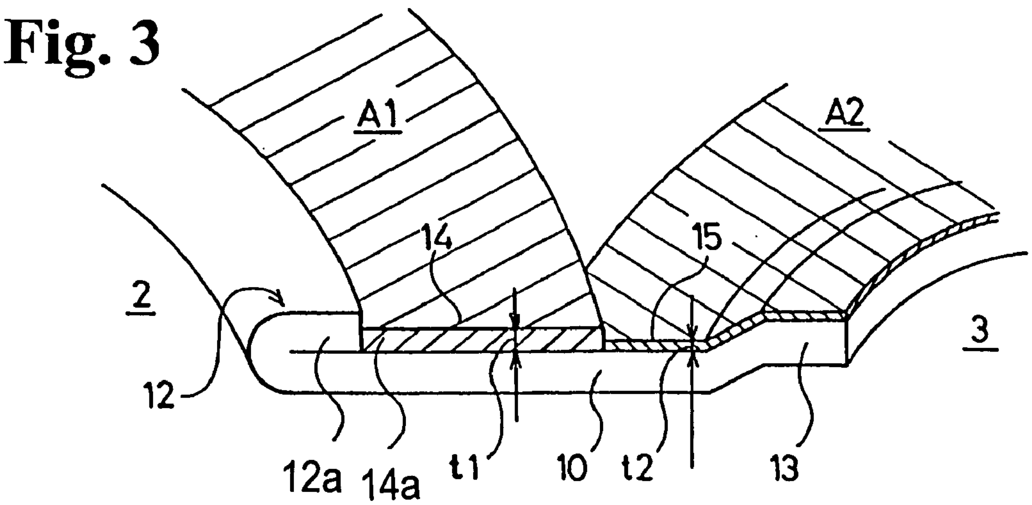
FIG. 3 is a sectional view showing a cylinder head gasket of a further embodiment of the present invention.

As shown in FIGS. 1 and 12, in the cylinder head gasket 1A, the first paint coating areas A1 formed of a hard first paint coating 14 are provided only on outer periphery sides of the folded portions 12. As shown in FIGS. 2, 13, in the cylinder head gasket 1B, the second paint coating areas A2 formed of a hard second paint coating 15 are provided only around the liquid holes 3. As shown in FIGS. 3, 14, in the cylinder head gasket 1C, the first paint coating areas A1 formed of the hard first paint coating 14 are provided on the outer periphery sides of the folded portions 12, and the second paint coating areas A2 formed of the hard second paint coating 15 are provided outside the first paint coating areas A1 around the liquid holes 3.

The second paint coating 15 has a thickness t2 less than a thickness t1 of the first paint coating 14. The paint coatings may have the uniform thicknesses t1 and t2, respectively. Alternatively, the paint coatings may have appropriate thickness distribution to obtain the required sealing performance.

The first paint coating 14 and the second paint coating 15 are formed of a hard synthetic resin with hardness 2H to 6H in pencil hardness such as an epoxy resin, phenol resin, phenoxy resin, fluorine resin, polyamide resin, and polyamide-imide resin, or a combination thereof for generating and maintaining a surface pressure for sealing. The first paint coating 14 and the second paint coating 15 may be formed with a method such as screen print. The first paint coating 14 and the second paint coating 15 may be formed of different materials.

In the first embodiment shown in FIGS. 1, 12, an inner edge 14*a* of the first paint coating area A1 touches an outer periphery edge 12*a* of the folded portion 12. Also, as shown in FIG. 1, the first paint coating 14 is provided on one side of the metal plate 10 where the folded edge 12*a* of the folded portion 12 is provided. Alternatively, the first paint coating 14 may be provided on the opposite side or both sides.

In the second embodiment shown in FIGS. 2, 13, the second paint coating area A2 is formed on an area including the half bead 13 around the liquid hole 3. In addition, as shown in FIG. 2, the second paint coating 15 is provided on one side of the metal plate 10 where the folded edge 12*a* of the folded portion 12 is provided. Alternatively, the second paint coating 15 may be provided on the opposite side or both sides. The second paint coating area A2 extends from an inner side 13*a* to an outer side 13*b* of the half bead 13.

In the third embodiment shown in FIGS. 3 and 14, the inner edge 14*a* of the first paint coating area A1 touches the outer periphery edge 12*a* of the folded portion 12. Also, the first paint coating 14 is provided on one side of the metal plate 10 where the folded edge 12*a* of the folded portion 12 is provided. The second paint coating area A2 is formed on an area including the half bead 13 around the liquid hole 3, and provided on the one side of the metal plate 10 where the first paint coating 14 is provided.

Figure 4:
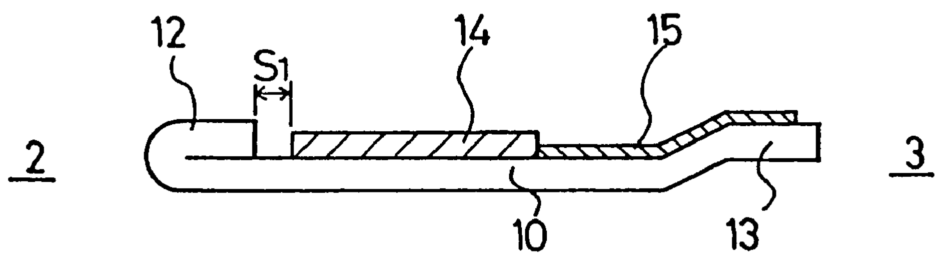
FIG. 4 is a sectional view showing a cylinder head gasket of a still further embodiment of the present invention.
Figure 5:
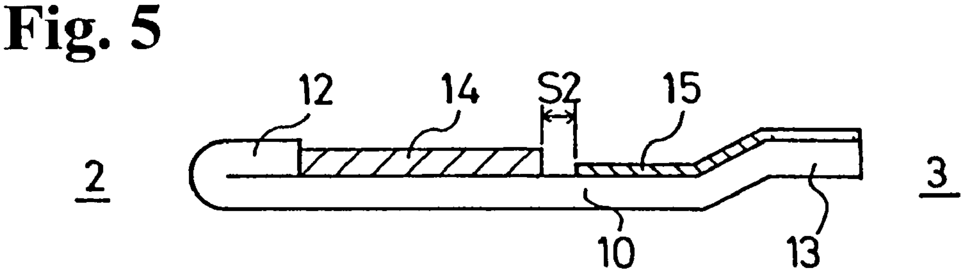
FIG. 5 is a sectional view showing a cylinder head gasket of a still further embodiment of the present invention.
Figure 9:
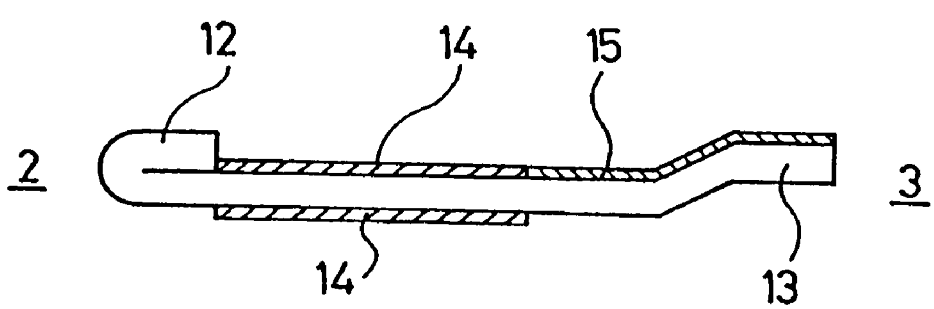
FIG. 9 is a sectional view showing a cylinder head gasket of a still further embodiment of the present invention.
Figure 10A:
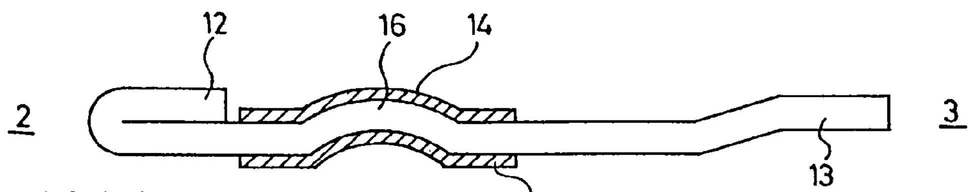
FIGS. 10(*a*)–10(*c*) are cross sectional views showing cylinder head gaskets provided with a bead for sealing a cylinder bore outside a folded portion, wherein FIG. 10(*a*) is a sectional view showing a cylinder head gasket of a still further embodiment.
Figure 10B:
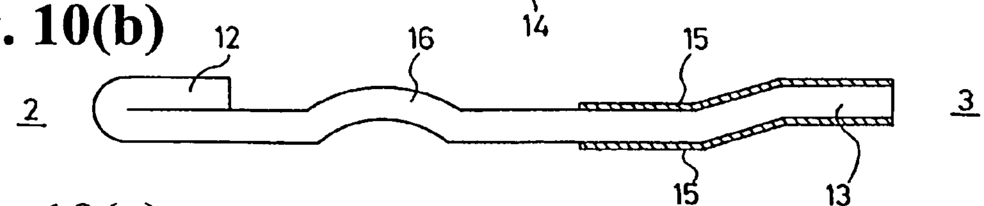
Figure 10C:
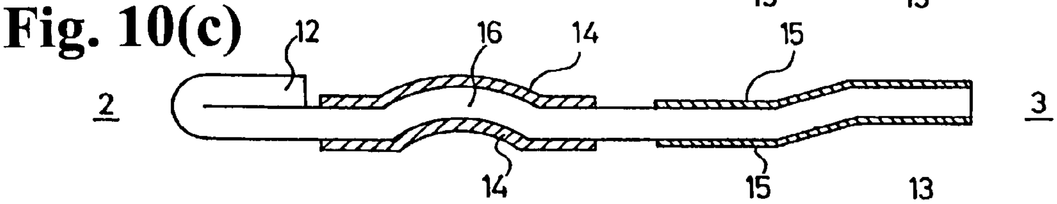

Other embodiments based on the cylinder head gasket 1C are shown in FIGS. 4 and 10(*a*)–10(*c*). As shown in FIGS. 4 and 5, the first paint coating 14 may be provided on one side of the metal plate 10. Alternatively, as shown in FIGS. 6 to 9, the first paint coatings 14 may be provided on both sides of the metal plate 10. As shown in FIGS. 1 and 5, the inner edge of the first paint coating area A1 may touch the outer periphery edge of the folded portion 12. Alternatively, as shown in FIGS. 4, 7 and 8, the inner edge of the first paint coating area A1 may be separated from the outer periphery edge of the folded portion 12*a* with a gap S1 in between. In other words, the first paint coating area A1 is formed such that the first paint coating area A1 does not overlap the folded portion 12.

Figure 6:
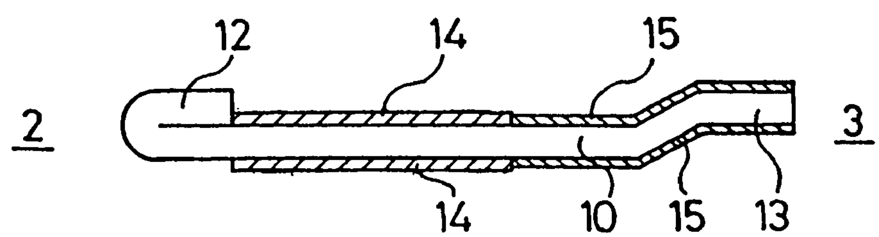
FIG. 6 is a sectional view showing a cylinder head gasket of a still further embodiment of the present invention.
Figure 7:
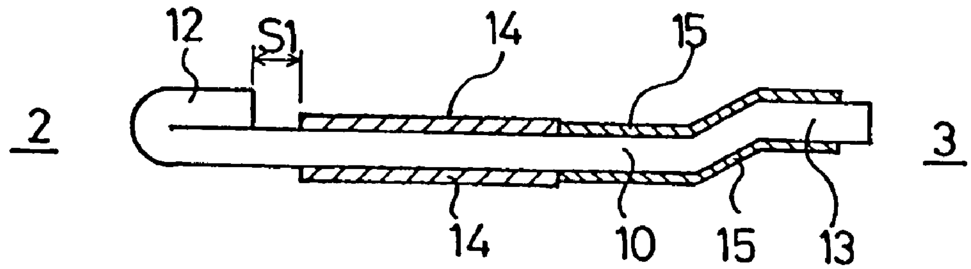
FIG. 7 is a sectional view showing a cylinder head gasket of a still further embodiment of the present invention.
Figure 8:
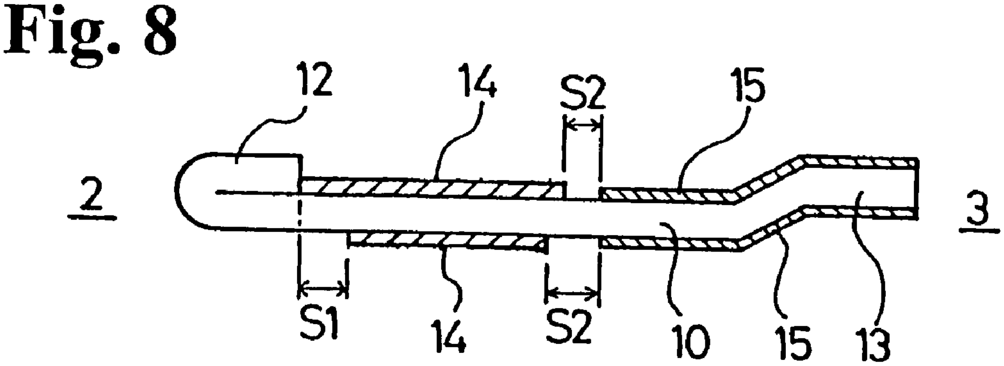
FIG. 8 is a sectional view showing a cylinder head gasket of a still further embodiment of the present invention.

When the first paint coating 14 and second paint coating 15 are provided on both sides of the metal plate 10, edges of the first paint coating 14 and the second paint coating 15 are aligned as shown in FIGS. 6, 7 and 9, or may be shifted as shown in FIG. 8. The second paint coating 15 may be provided only on one side of the metal plate 10 as shown in FIGS. 4, 5 and 9, or the second paint coating 15 may be provided on both sides of the metal plate 10 as shown in FIGS. 6 to 8. Alternatively, as shown in FIG. 9, the first paint coating 14 may be provided on both sides and the second paint coating 15 may be provided on one side. As shown in FIGS. 4, 6 to 8 and 9, the second paint coating areas A2 may be provided such that the second paint coating areas A2 do not overlap the first paint coating areas A1 and continue with a step. Alternatively, as shown in FIGS. 5 and 8, the second paint coating areas A2 may be separated with a gap S2.

Furthermore, as shown in FIG. 3, the first paint coating area A1 may be provided only around the cylinder bore 2 and the second paint coating area A2 may be provided only around the liquid hole 3. Although not shown in the drawings, the first paint coating area A1 may be provided only around the cylinder bore 2 and the second paint coating area A2 may be provided on the remaining area.

As shown in FIGS. 10(*a*)–10(*c*), the bead 16 for sealing the cylinder bore 2 may be provided outside the folded portion 12 around the cylinder bore 2. In this case, the whole part or a part of the bead 16 may be included inside the first paint coating area A1 wherein the first paint coating 14 is applied, and also the bead 16 may be provided outside the first paint coating area A1.

In a case that the cylinder bore has a diameter of 80 mm, the metal plate 10 may have a thickness of 0.15 to 0.35 mm; the bead 13 for the liquid hole 3 may have a height of 0.10 to 0.40 mm; the first paint coating area 14 may have the thickness t1 of 0.02 to 0.30 mm; and the second paint coating area 15 may have the thickness t2 of 0.01 to 0.25 mm.

Although not shown in the drawings, a micro-seal coating may be formed on substantially the whole area of the cylinder head gasket 1 for sealing small undulation.

In the cylinder head gaskets 1A and 1C, the first paint coating 14 of the first paint coating area A1 forms and maintains the surface pressure around the cylinder bore 2, thereby forming the sealing line and improving the sealing performance around the cylinder bore 2. In addition, the first paint coating area A1 is provided on the outer periphery side of the folded portion 2. Therefore, the first paint coating 14 is protected from the high-temperature and high-pressure gas from the cylinder bore with the folded portion 2.

In the cylinder head gasket 1B, the second paint coating area A2 is provided around the liquid hole 3, so that a relatively large surface pressure is formed at the folded portion 2. The paint coating 15 and the half bead 13 form and maintain a relatively small surface pressure around the liquid hole 3. Therefore, the paint coating 15 forms the sealing lines outside and inside the half bead 13, thereby improving the sealing performance around the liquid hole 3.

Figure 11:
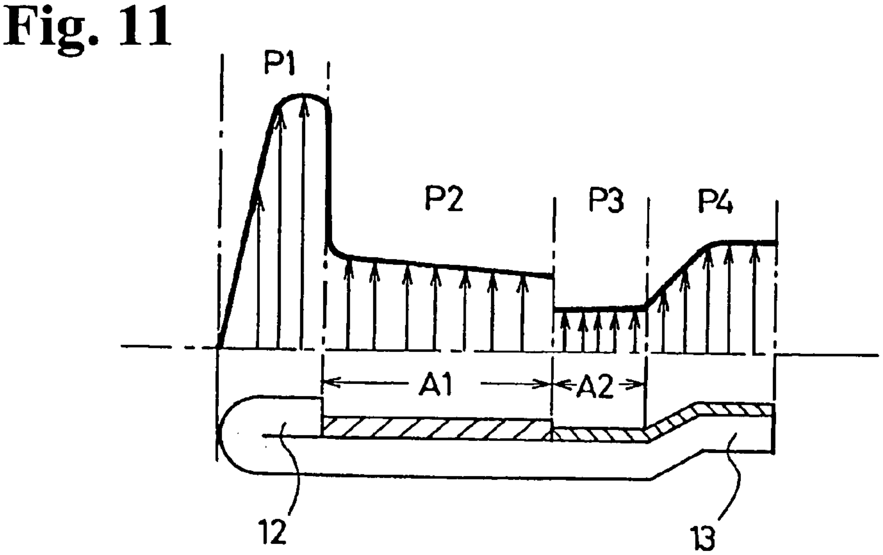
FIG. 11 is a drawing showing a distribution of a surface pressure of the cylinder head gasket shown in FIG. 3.

In the cylinder head gasket 1, the second paint coating area A2 with a thickness less than that of the first paint coating area A1 is provided around the liquid hole 3. Therefore, as shown in FIG. 11, when a fastening bolt is fastened, a relatively large surface pressure P1 is generated at the folded portion 12, a medium-sized surface pressure P2 less than the surface pressure P1 is generated around the cylinder bore 2, and a relatively small surface pressure P3 less than the surface pressure P2 and a surface pressure P4 larger than the surface pressure P3 with the half bead 13 are generated around the liquid hole 3. As a result, the cylinder head gasket 1 is provided with the sealing performances required for the cylinder bore 2 and the liquid hole 3.

Furthermore, it is possible to easily adjust a thickness of the paint layer through the number of applications of the paint, and to easily select a location of the applications. Accordingly, it is possible to provide the surface pressure generating member, i.e. the first paint coating 14 and the second paint coating 15, having an arbitrary shape and a thickness distribution with high precision around the cylinder bore 2, thereby obtaining the proper distribution of the surface pressure around the cylinder bore 2.

It is possible to adjust the surface pressures P1, P2, P3 and P4 by adjusting the thickness t1 of the first paint coating 14 and the thickness t2 of the second paint coating 15. It is possible to easily adjust the thicknesses of the first and second paint coatings through the number of applications, thereby obtaining the required sealing performances. The invention is not limited to the embodiments, and the beads around the liquid holes 3 are also not limited to the half beads and may be full beads.

As described above, according to the present invention, the surface pressure generating member is formed of the hard paint coating for generating and maintaining the surface pressure around the cylinder bore, thereby generating the most appropriate surface pressure distribution even outside the folded portion and obtaining the excellent sealing performance around the cylinder bore.

The hard paint coating is provided on the outer periphery side of the folded portion. Therefore, the folded portion seals the high-temperature and high-pressure gas from the cylinder bore. Also, the surface pressure generating member is formed of the hard paint coating for generating and maintaining the surface pressure around the liquid hole, thereby forming the appropriate surface pressure distributions even outside and inside the liquid hole, and improving the sealing performance around the liquid hole.

The second paint coating area with the thickness less than that of the first paint coating area is provided around the liquid hole with the half bead in addition to the folded portion and the first paint coating area. Therefore, the appropriate surface pressure distributions can be easily provided around the cylinder bore and the liquid hole.

Furthermore, it is possible to easily adjust the thickness of the paint layer through the number of applications of the paint, and to easily select a location of the applications. Accordingly, it is possible to provide the surface pressure generating member having an arbitrary shape with high precision around the cylinder bore and the liquid hole, thereby obtaining the proper distributions of the surface pressure around the cylinder bore and the liquid hole.

Therefore, the cylinder head gasket is simultaneously provided with the sealing performances for the cylinder bore and the liquid hole. The appropriate sealing balance relative to the part of the gasket is easily achieved, and the cylinder head gasket has the excellent sealing performance and the outstanding durability.

While the invention has been explained with reference to the specific embodiments of the invention, the explanation is illustrative and the invention is limited only by the appended claims.

What is claimed is:

1. A cylinder head gasket, comprising:

one metal plate for forming the gasket having a cylinder bore, a folded portion formed around the cylinder bore and having a largest thickness in the gasket, a liquid hole and a half bead formed around the liquid hole, and a paint coating formed on at least one side of the metal plate outside the folded portion without overlapping thereto for forming a surface pressure thereat, said paint coating having a hardness of 2H–6H in pencil hardness and being formed around the folded portion to form a first paint coating therearound and also formed on and around the half bead surrounding the liquid hole outside the first paint coating to form a second paint coating therearound, said second paint coating having a thickness less than that of the first paint coating, wherein said half bead forms an inner portion and an outer portion relative to the liquid hole so that when the gasket is tightened, surface pressures on the gasket are arranged such that the folded portion is greater than the inner portion; the inner portion is greater than the first paint coating; and the first paint coating is greater than the outer portion.

* * * * *